US007522399B2

(12) United States Patent
Siljeholm et al.

(10) Patent No.: US 7,522,399 B2
(45) Date of Patent: Apr. 21, 2009

(54) SURGE ARRESTER

(75) Inventors: Roger Siljeholm, Ludvika (SE); Kerstin Ekeroth Reijm, Idkerberget (SE)

(73) Assignee: ABB Technology Ltd., Zürich (CH)

( * ) Notice: Subject to any disclaimer, the term of this patent is extended or adjusted under 35 U.S.C. 154(b) by 51 days.

(21) Appl. No.: 10/554,088

(22) PCT Filed: Apr. 28, 2004

(86) PCT No.: PCT/SE2004/000647

§ 371 (c)(1),
(2), (4) Date: Oct. 21, 2005

(87) PCT Pub. No.: WO2004/097858

PCT Pub. Date: Nov. 11, 2004

(65) Prior Publication Data

US 2006/0227484 A1 Oct. 12, 2006

(30) Foreign Application Priority Data

Apr. 30, 2003 (SE) .................................... 0301254

(51) Int. Cl.
*H02H 1/00* (2006.01)
*H02H 7/04* (2006.01)
*H02H 9/06* (2006.01)

(52) U.S. Cl. ......................... 361/127; 361/39; 361/117; 361/126

(58) Field of Classification Search ................. 361/127, 361/126, 39, 117
See application file for complete search history.

(56) References Cited

U.S. PATENT DOCUMENTS

| | | | | |
|---|---|---|---|---|
| 4,989,115 | A | 1/1991 | Bourdages et al. | |
| 5,050,032 | A | 9/1991 | Thevenet et al. | |
| 5,113,306 | A | 5/1992 | Veverka et al. | |
| 5,291,366 | A | 3/1994 | Giese et al. | |
| 5,517,382 | A | 5/1996 | Leupp et al. | |
| 5,608,597 | A * | 3/1997 | Holmstrom et al. | 361/127 |
| 5,912,611 | A | 6/1999 | Berggren et al. | |

FOREIGN PATENT DOCUMENTS

| | | | |
|---|---|---|---|
| EP | 0683496 | A1 | 11/1995 |
| JP | 2002015904 | A | 1/2002 |

* cited by examiner

*Primary Examiner*—Stephen W Jackson
*Assistant Examiner*—Lucy Thomas
(74) *Attorney, Agent, or Firm*—Venable LLP; Eric J. Franklin

(57) ABSTRACT

A surge arrester including a stack of a plurality of cylindrical varistor blocks that are arranged one after the other in the axial direction of the varistor blocks between an upper end electrode and a lower end electrode. Arranged around the stack are clamping members of an insulating material including at least three loops of continuously wound fiber that connect the upper end electrode to the lower end electrode as well as a bursting-protective bandage in the form of a plurality of rings wound of fiber, and a surrounding, electrically insulating, outer casing of rubber or other polymeric material. The loops are wound from glass fiber and exhibit an asymmetrical cross section.

8 Claims, 2 Drawing Sheets

SURGE ARRESTER

TECHNICAL FIELD

The present invention relates to a surge arrester comprising a stack of a plurality of cylindrical varistor blocks, which are arranged one after the other in the axial direction of the varistor blocks, between an upper end electrode and a lower end electrode. Arranged around the stack are clamping members of insulating material, comprising at least three loops of continuously wound fibre, which connect the upper end electrode to the lower end electrode, and a busting-protective bandage in the form of a plurality of rings or bands wound of fibre, and a surrounding, electrically insulating, outer casing of rubber or other polymeric material.

BACKGROUND ART

Surge arresters are used to protect expensive electrical equipment from overvoltages. A common product for this purpose are cylindrical blocks of metal oxide, for example zinc oxide, so-called varistors. These have the property that the resistance is high at low voltage but low at high voltage. When the operating voltage is higher than the varistor is able to resist and exhibit a high resistance, several varistor blocks are connected in series in a stack. To carry large heavy currents through a stack, a sufficient contact pressure must be achieved between the blocks.

U.S. Pat. No. 5,291,366 (CH 682 858) discloses a surge arrester with a stack of zinc-oxide blocks clamped between two end electrodes with the aid of a clamping member consisting of two insulating elements connecting the two end electrodes.

U.S. Pat. No. 5,912,611 (SE 504 075) discloses a surge arrester with a stack of zinc-oxide blocks clamped between two end electrodes with the aid of a clamping member consisting of at least three insulating elements connecting the two end electrodes.

To achieve improved resistance to transversal mechanical influence, a central pivot member is placed between one end electrode and the nearest zinc-oxide block in the stack.

The dimensioning of a surge arrester is critical and since its function as protection for, for example, a transformer implies that it is to carry a large current for a short period, the risk of breakdown can never be completely excluded. This may occur, for example, by ionization and electrical discharges in or around the varistor blocks which, by means of pressure increase caused by gas generation, may burst the casing of the surge arrester.

For this reason, it is not suitable for the casing to be made of a material that may be fragmented at an internal pressure increase, but instead to be made of rubber or a similar material. On the one hand, the casing should be so strong that it may actively counteract that parts of the varistors are thrown out. On the other hand, the casing should be able to permit pressure relief by releasing generated gas without completely bursting the casing.

In U.S. Pat. No. 5,050,032 (SE 516 123), a balance has been struck between the above-mentioned requirements, wherein a varistor stack and compression loops are radially surrounded by a busting-protective bandage of insulating material provided with openings for pressure relief. The bursting-protective bandage may consist of a plurality of tubular rings arranged at a certain axial distance between them. The casing, for example of rubber, is cast on so that the material also fills up the space between the varistor stack and the rings. The bursting-protective bandage may consist of a thermosetting resin with continuously wound glass or aramide fibres and will then have an essentially square shape.

By ring is to be understood, in SE 516 123 and in this application, essentially every closed curve and thus also curves which deviate from a circular shape. Experiences in practice have proved that the embodiment according to said SE 516 123 has several critical parameters. If the rings are too far away from the varistor stack, the volume of the insulant has to be increased, which, of course, increases the cost, but above all it deteriorates the short-circuit performance because the rubber, or corresponding material, inside the rings prevents the arrester from ventilating and a higher pressure is built up. This results in a much more violent short-circuit behaviour. For this reason, the rings should be as close to the stack as possible. On the other hand, the rings must not be in direct contact with the blocks. If there is no gap between the rings and the block, filled with rubber or the like, an exceedingly powerful bursting of the blocks is obtained, the windings being torn off and pieces of the blocks being thrown out.

For natural reasons, the proposed, approximately square winding provides a considerable variation of the distance between the blocks and the rings. To this is to be added the fact that the successive application of several turns compresses the loops and reduces the stress, provides a slack, in the innermost turns. These turns will then hang down towards the stack. See FIG. 2. There is a considerable risk that the "belly" reaches the stack unless winding is performed with a decreasing tensile stress.

OBJECT OF THE INVENTION

It is a first object of the present invention to provide a surge arrester for medium voltage and high voltage with a predictable behaviour in case of a breakdown.

It is a second object of the present invention to provide a surge arrester that can be manufactured with less variation of performance than hitherto known arresters.

It is a main object of the invention to provide a surge arrester that has improved short-circuit performance, that has smaller volume, and that may be manufactured in a more economic manner than according to the prior art.

SUMMARY OF THE INVENTION

The present invention relates to a surge arrester comprising a stack of a plurality of cylindrical varistor blocks, which are arranged one after the other in the axial direction of the varistor blocks, between an upper end electrode and a lower end electrode. Arranged around the stack are clamping members of insulating material comprising at least three loops of continuously wound fibre, which connect the upper end electrode to the lower end electrode, and a busting-protective bandage in the form of a plurality of rings or bands wound of fibre, and a surrounding, electrically insulating, outer casing of rubber or other polymeric material.

In the surge arrester according to the invention, the loops are wound of glass fibre and exhibit an asymmetrical cross section.

GENERAL DESCRIPTION OF THE INVENTION

The inventive concept is based on the realization that surge arresters are sometimes loaded such that they break down and that this may even involve danger to humans and nearby equipment, and on the experience that it has so far proved to be difficult to manufacture large series of surge arresters with a uniform quality, measurable performance, and predictable breakdown behaviour.

To solve this problem, the present invention suggests building a surge arrester comprising a stack of a plurality of cylindrical varistor blocks, between an upper end electrode and a lower end electrode. Around the stack there are placed clamping members of insulating material and comprising at least three loops of continuously wound fibre, which connect the upper end electrode to the lower end electrode.

The loops are wound of glass fibre and exhibit an asymmetrical cross section. By this is meant that the cross section of the two strands of the loops are mirror images of each other, that is, if a radial section is made through the surge arrester, the section cuts through each loop twice and the cut surfaces obtained are mirror images of each other but cannot, without rotation, cover each other. Thus, cut surfaces which have one or more symmetry axes may very well be used within the scope of the invention, as long as the two cut surfaces are mirror images of each other and the respective symmetry axes are not parallel.

A bursting-protective bandage in the form of a plurality of rings or bands is arranged around the stack of varistors and clamping members. The rings or bands are suitably wound of aramide or PBO fibre with an epoxy or vinyl ester matrix.

The loops are to make contact with the stack and the bursting-protective bandage is to make contact with the loops so that these are pressed against the stack.

It is important that the asymmetrical cross section of the loops is so shaped and placed that not only two corners, one on each strand, make contact with the varistor stack as in the prior art with loops of rectangular cross section. The asymmetrical cross section of the loops may suitably be adapted to increase the contact surface against the varistor stack.

Further, the asymmetrical cross section of the loops may be adapted to shorten the free span for the rings or bands inside the loops and/or be adapted to enable the rings or bands to be wound closer to the stack.

It is also possible to adapt the asymmetrical cross section of the loops so that the shape of the rings or the bands becomes approximately circular.

In a preferred embodiment, the cross section of the loops corresponds essentially to two mirror-inverted rhombs or rhomboids.

BRIEF DESCRIPTION OF THE DRAWING

The invention will now be explained in greater detail with reference to the accompanying drawing, wherein FIG. 1 schematically shows a surge arrester embedded into an electrically insulating casing.

DESCRIPTION OF THE PREFERRED EMBODIMENT

Figure 1:
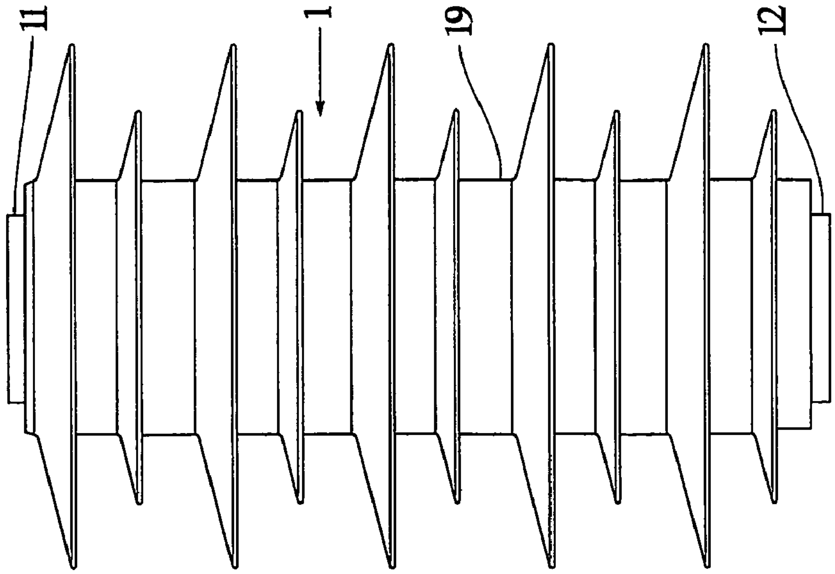
Figure 6:
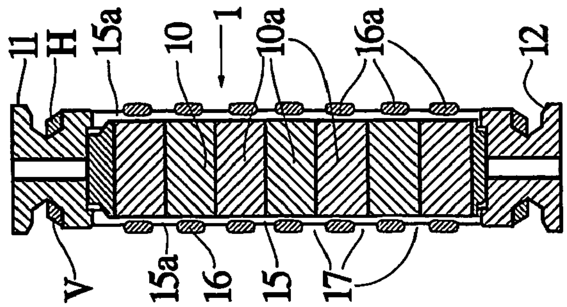
FIG. 6 is a reduced and somewhat simplified representation of FIG. 3.

FIG. 1 shows a surge arrester 1 with an upper end electrode 11 and a lower end electrode 12 and an electrically insulating casing 19.

Figure 2:
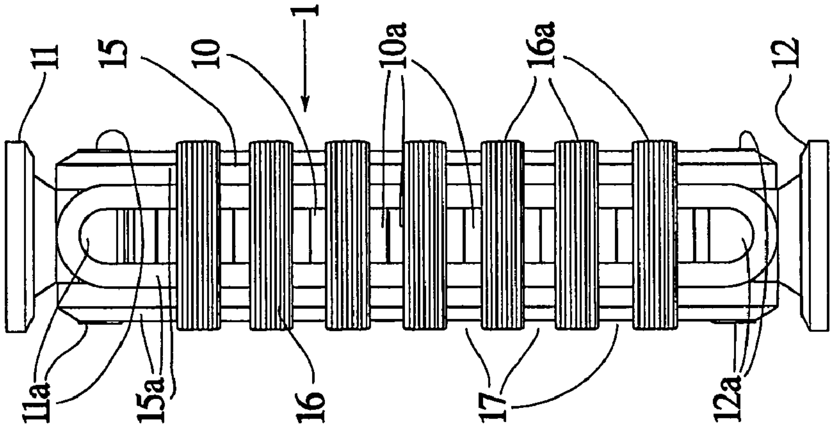
FIG. 2 schematically shows the same surge arrester prior to being embedded into the electrically insulating casing.

FIG. 2 shows a corresponding surge arrester 1 without the electrically insulating casing. A stack 10, comprising seven cylindrical varistor blocks 10*a* of circular cross section, is arranged between the upper end electrode 11 and the lower end electrode 12. The symmetry axes of the varistor blocks 10*a* coincide. The diameter of the varistor blocks 10*a* is 60 mm and their height 40 mm. Arranged around the stack 10 are clamping members 15 in the form of four loops, of which three 15*a* are shown in the figure. The loops 15*a* are wound of continuous glass fibre and impregnated with epoxy. The loops 15*a* run around the shoulders 11*a* of the upper end electrode 11 and the shoulders 12*a* of the lower end electrode 12 and clamp the end electrodes 11, 12 against the stack 10, thus creating the desired contact pressure between the varistor blocks 10*a*. The loops 15*a* make contact with the stack 10 of varistor blocks 10*a*.

Outside the loops 15*a* there is a bursting-protective bandage 16 in the form of seven rings 16*a*, placed essentially at the centre of the height for the respective varistor blocks 10*a*. The rings 16*a* are wound of aramide fibre in an epoxy matrix and make tight contact with the loops 15*a* so that these are pressed against the varistor blocks 10*a*. The height of the rings 16*a* is 20 mm and the their thickness is 5 mm. Between two adjacent rings 16*a*, opposite to the contact surface between the varistor blocks 10*a* in question, there is an annular opening 17, about 20 mm high, to allow pressure relief.

Figure 3:
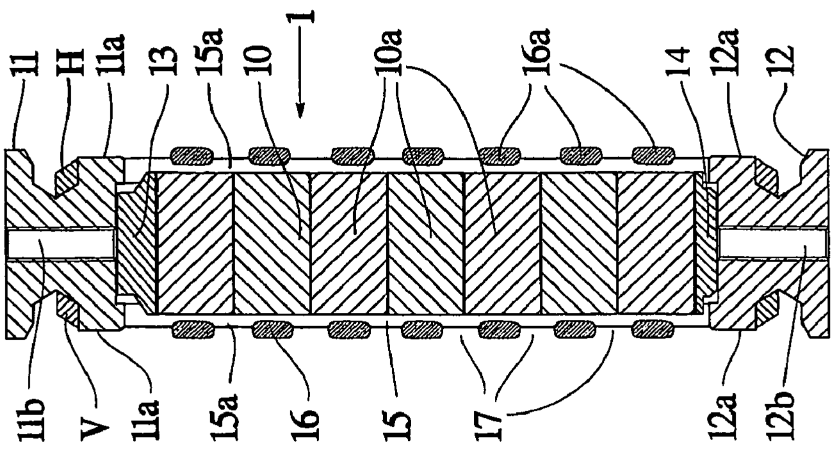
FIG. 3 schematically shows an axial section through the surge arrester according to FIG. 2.

FIG. 3 shows an axial section through the same surge arrester 1 as in FIG. 2, that is, without the electrically insulating casing. In addition to the features shown in FIG. 2, there are shown between the lower end electrode 12 and the stack 10 a pivot washer 14 and between the upper end electrode 11 and the stack 10 a length adjustment device 13. For the sake of simplicity, the length adjustment device 13 is not shown in detail, but the task of the device is to lengthen the stack so that the clamping force in the loops 15*a* really provides the desired contact pressure between the varistor blocks in the stack 10. The end electrodes are provided with threaded holes 11*b*, 12*b* to function as electrical connection or make possible a series connection of two or more surge arresters 1.

Figure 4:
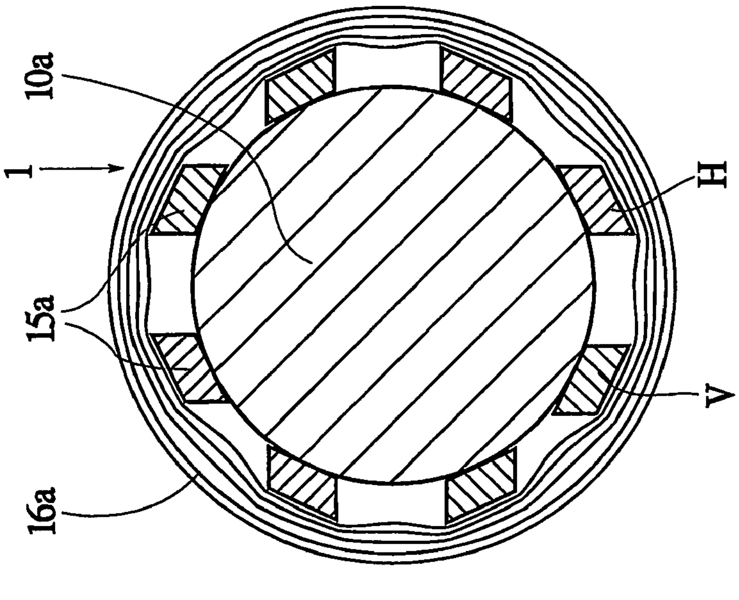
FIG. 4 schematically shows a radial section through the surge arrester according to FIG. 2.

FIG. 4 shows, by means of a radial section through the same surge arrester 1 as in FIG. 2, that is, without the gelectrically insulating casing, a section of the surge arrester 1. The section shows a varistor block 10*a*, a clamping member with four loops 15*a*, and a surrounding bursting-protective bandage consisting of a ring 16*a* of aramide fibre with an epoxy matrix. The section through the loops 15*a* exhibits, for each loop 15*a*, pairwise mirror-inverted rhomboids V, H.

Figure 5:
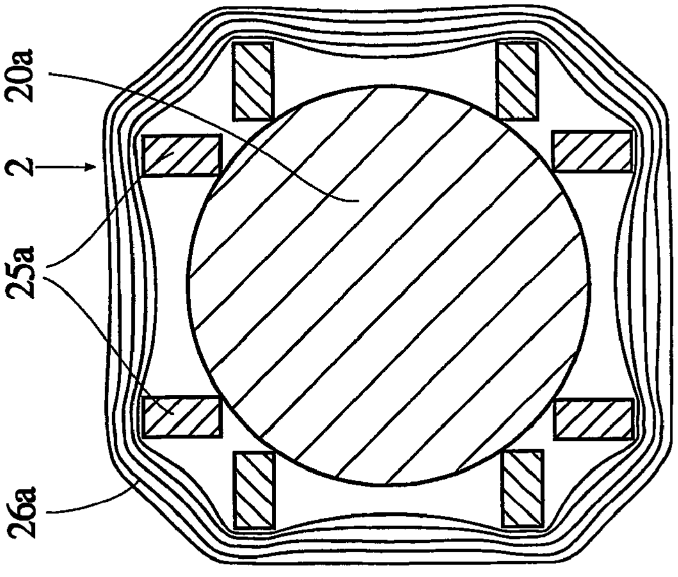
FIG. 5 schematically shows, in a way corresponding to that in FIG. 4, a radial section through a prior art surge arrester.

FIG. 5 shows, in the same way as FIG. 4, by means of a radial section through a prior art surge arrester 2, a section of the surge arrester 2. The surge arrester 2 is made, for example, according to U.S. Pat. No. 5,050,032 (SE 516 123 C2), where a stack of varistor blocks 20*a* is surrounded by a clamping member with four loops 25*a* of rectangular, symmetrical cross section, which in turn are surrounded by a bursting-protective bandage in the form of rings 26*a* of aramide fibre.

In FIGS. 4 and 5, the appearance of the rings 16*a* and 26*a* is only schematically shown by means of five lines, the shapes of which intentionally are not drawn to scale. The purpose is to illuminate the particular problems which may arise during manufacture and which the present invention is intended to reduce or, hopefully, completely eliminate.

The invention claimed is:

1. A surge arrester, comprising:

a stack of a plurality of cylindrical varistor blocks, which are arranged one after another in an axial direction of the varistor blocks, an upper end electrode and a lower end electrode, clamping members of insulating material comprising at least three loops of continuously wound fiber, which connect the upper end electrode to the lower end electrode, wherein each of said loops comprises a first strand and a second strand, wherein a cross-section of the first strand is a mirror image of a cross-section of the second strand, and wherein the first strand and the second strand each comprise a surface facing the varistor stack, a bursting-protective bandage comprising a plurality of rings or bands wound of fiber, said bandage radially surrounding the varistor stack and the clamping loops, wherein the cross sections of the loops are adapted such that shapes of the rings or bands are substantially circular, and a surrounding, electrically insulating, outer casing of rubber or other polymeric material.

2. The surge arrester according to claim 1, wherein the loops are shaped and located so that not only two corners, one on either strand, make contact with the varistor stack.

3. The surge arrester according to claim 1, wherein the cross sections of the loops are adapted to increase a contact surface against the varistor stack.

4. The surge arrester according to claim 1, wherein the cross sections of the loops are adapted to shorten a free span of the rings or bands inside the loops.

5. The surge arrester according to claim 1, wherein the cross sections of the loops are adapted to enable the rings or bands to be wound closer to the stack.

6. The surge arrester according to claim 1, wherein the cross sections of the loops essentially correspond to two mirror-inverted rhombs or rhomboids.

7. The surge arrester according to claim 1, wherein the rings or bands comprise aramide fiber or PBO fiber with an epoxy or vinyl ester matrix.

8. The surge arrester according to claim 1, wherein the varistor blocks comprise metal oxide.

* * * * *